(12) United States Patent
Basu et al.

(10) Patent No.: US 12,204,792 B2
(45) Date of Patent: Jan. 21, 2025

(54) ADAPTIVE THROUGHPUT MONITORING

(71) Applicant: Micron Technology, Inc., Boise, ID (US)

(72) Inventors: Reshmi Basu, Boise, ID (US); David Aaron Palmer, Boise, ID (US); Jonathan S. Parry, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 587 days.

(21) Appl. No.: 17/396,117

(22) Filed: Aug. 6, 2021

(65) Prior Publication Data

US 2023/0040336 A1   Feb. 9, 2023

(51) Int. Cl.
*G06F 3/06* (2006.01)
*G06F 1/08* (2006.01)

(52) U.S. Cl.
CPC .............. *G06F 3/0659* (2013.01); *G06F 1/08* (2013.01); *G06F 3/0613* (2013.01); *G06F 3/0679* (2013.01)

(58) Field of Classification Search
CPC .... G06F 3/0659; G06F 3/0613; G06F 3/0679; G06F 1/08
See application file for complete search history.

(56) References Cited

U.S. PATENT DOCUMENTS

| | | | | |
|---|---|---|---|---|
| 7,167,994 | B2 * | 1/2007 | Zdravkovic | G06F 1/324 |
| | | | | 713/320 |
| 10,854,245 | B1 * | 12/2020 | Shah | G06F 1/3275 |
| 2001/0011356 | A1 * | 8/2001 | Lee | G06F 1/3275 |
| | | | | 711/167 |
| 2009/0161428 | A1 * | 6/2009 | Unger | G06F 1/3203 |
| | | | | 365/185.09 |
| 2010/0295582 | A1 * | 11/2010 | Gaulin | G06F 1/08 |
| | | | | 327/114 |
| 2016/0225348 | A1 * | 8/2016 | Maiya | G06F 1/3206 |
| 2017/0300263 | A1 * | 10/2017 | Helmick | G06F 3/0679 |
| 2019/0094938 | A1 * | 3/2019 | Tidwell | G06F 1/324 |
| 2019/0179547 | A1 * | 6/2019 | Szubbocsev | G06F 13/4234 |
| 2020/0402593 | A1 * | 12/2020 | Hassan | G11C 16/32 |

OTHER PUBLICATIONS

Fan, Xiaobo, Carla Ellis, and Alvin Lebeck. "Memory controller policies for DRAM power management." Proceedings of the 2001 international symposium on Low power electronics and design. 2001. (Year: 2001).*

Kim, Jeonghun, et al. "An 8M polygons/s 3-D graphics SoC with full hardware geometric and rendering engine for mobile applications." IEEE transactions on very large scale integration (VLSI) systems 19.8 (2010): 1490-1495. (Year: 2010).*

Asghari-Moghaddam, Hadi, et al. "Chameleon: Versatile and practical near-DRAM acceleration architecture for large memory systems." 2016 49th annual IEEE/ACM international symposium on Microarchitecture (MICRO). IEEE, 2016. (Year: 2016).*

* cited by examiner

*Primary Examiner* — Nicholas J Simonetti
(74) *Attorney, Agent, or Firm* — Holland & Hart LLP

(57) ABSTRACT

Methods, systems, and devices for adaptive throughput monitoring are described. In some examples, a memory system may be associated with one or more clocks that are each associated with a respective subcomponent. When the memory system receives a plurality of commands, the memory system may determine a throughput of the commands. Based on the determined throughput, the memory system may adjust a rate of one or more of the clocks.

21 Claims, 7 Drawing Sheets

ADAPTIVE THROUGHPUT MONITORING

FIELD OF TECHNOLOGY

The following relates generally to one or more systems for memory and more specifically to adaptive throughput monitoring.

BACKGROUND

Memory devices are widely used to store information in various electronic devices such as computers, user devices, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Operations may be performed on a memory system using a clock rate that is set based on the bandwidth of a host system. For example, the host system may be configured to set the speed at which it communicates with the memory system. In some instances, the host system may be configured to set its bandwidth requirements at a relatively high speed, which may result in the clock (or clocks) of the memory system being set a maximum rate. However, in some instances, the clock of the memory system may be set at a maximum rate despite the actual throughput between the host system and memory system being lower. Because memory systems have relatively low power budgets, it may be desirable to adjust the rate(s) of one or more clocks of a memory system based on the actual throughput between a host system and the memory system.

A memory system configured to determine a throughput of commands received from a host system is described herein. In some instances, the memory system may include components (e.g., dividers) for setting the rates (e.g., frequencies) at which various clocks operate. For example, the memory system may include a system clock, an interface (e.g., Open NAND Flash Interface (ONFI)) clock, and a CPU clock, among others. The memory system may receive one or more commands from a host system and may transition to a mode (e.g., a second mode, an analysis mode) to determine the throughput of the commands. While operating in the second mode, the memory system may set the rate of each clock to a maximum value to anticipate the host system requiring maximum bandwidth. Upon calculating the throughput of the commands, the memory system may adjust the rate of one or more clocks (e.g., adjust the rate downward). Adjusting the rate of the clock(s) based on the calculated throughput may result in a power savings that may otherwise be incurred due to clocks operating at unnecessarily or undesirably high rates.

Figure 1:
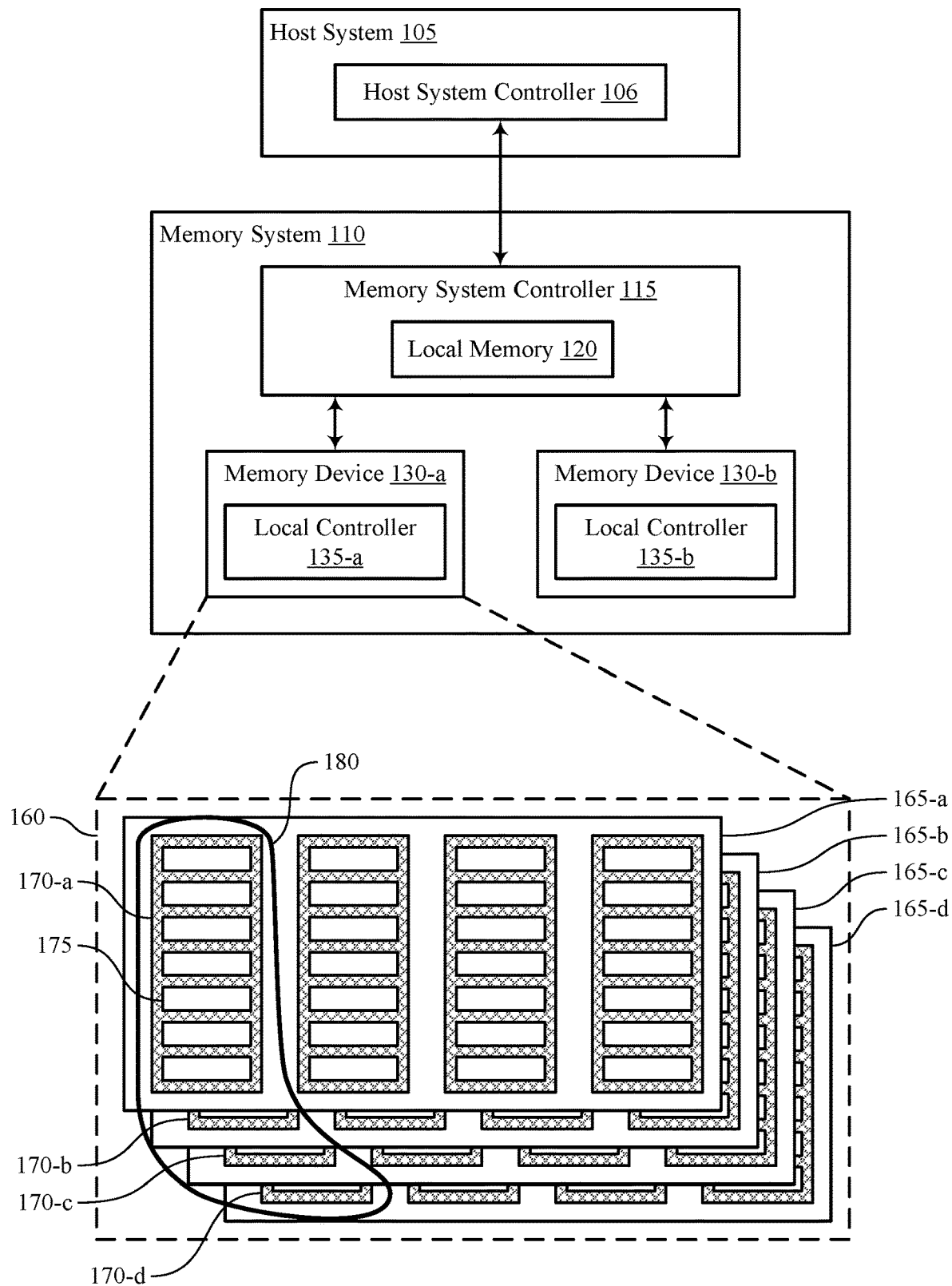
FIG. 1 illustrates an example of a system that supports adaptive throughput monitoring in accordance with examples as disclosed herein.
Figure 2:
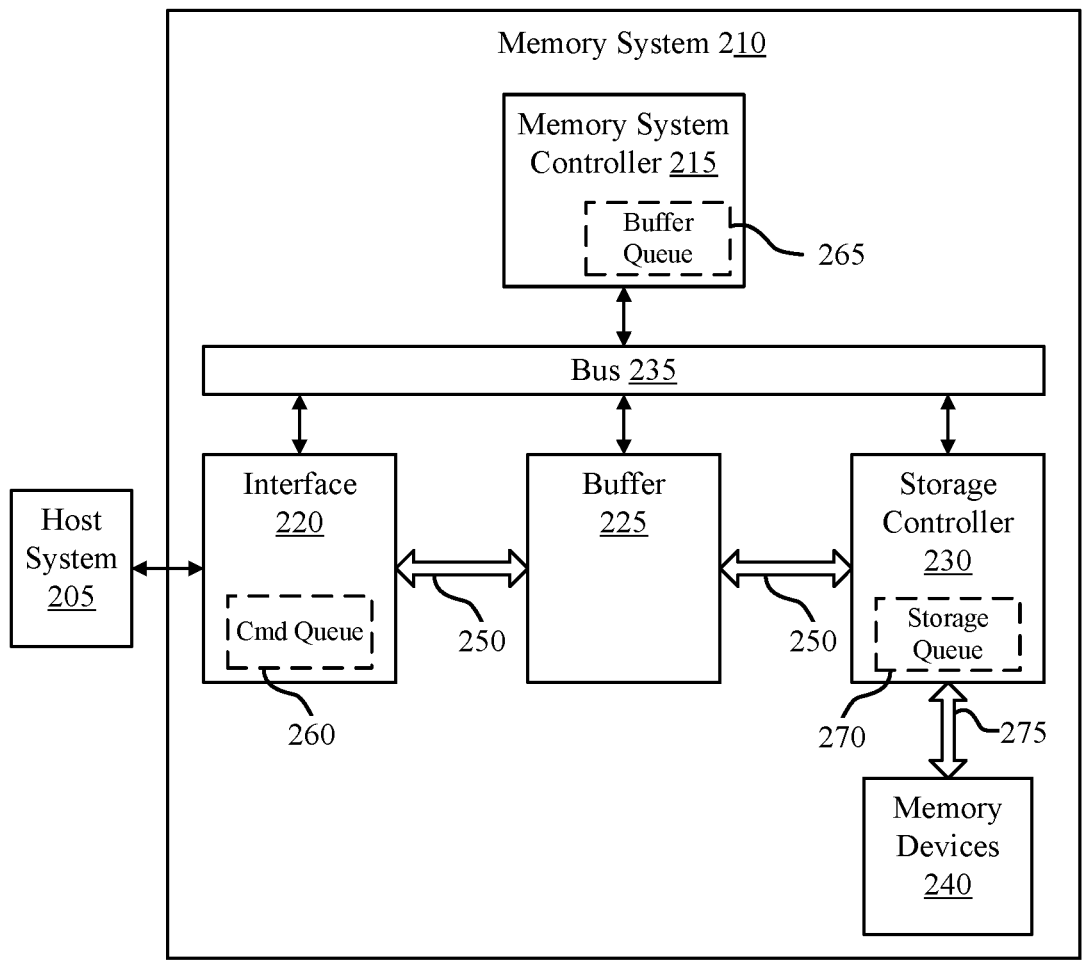
FIG. 2 illustrates an example of a system that supports adaptive throughput monitoring in accordance with examples as disclosed herein.

Features of the disclosure are initially described in the context of systems, devices, and circuits with reference to FIGS. 1 through 2. Features of the disclosure are described in the context of a memory system and block diagram with reference to FIGS. 3 and 4. These and other features of the disclosure are further illustrated by and described in the context of an apparatus diagram and flowchart that relate to adaptive throughput monitoring with reference to FIGS. 5-7.

FIG. 1 illustrates an example of a system 100 that supports adaptive throughput monitoring in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

The system 100 may include any quantity of non-transitory computer readable media that support adaptive throughput monitoring. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

In some examples, the memory system 110 may include one or more clocks for various subcomponents. For example, a memory die 160 may be associated with a system clock, the memory system controller 115 may include a processor (e.g., a CPU) that is associated with a CPU clock and a datapath that is associated with an interface clock. The rate at which the clocks operate (e.g., the frequency of the clocks) may be set or adjusted by the memory system controller 115. For example, the memory system 110 may receive one or more commands from the host system 105. Upon receiving the commands, the memory system controller 115 may determine a throughput of the commands, which may be calculated using various factors as described herein. Based on the calculated throughput, the memory system controller 115 may maintain or adjust (e.g., upward or downward) the rate of any one clock or of multiple clocks. Adjusting the rate of the clock(s) based on the calculated throughput may result in saving power that may otherwise be incurred due to clocks operating at unnecessarily high rates.

FIG. 2 illustrates an example of a system 200 that supports adaptive throughput monitoring in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include memory devices 240 to store data transferred between the memory system 210 and the host system 205, e.g., in response to receiving access commands from the host system 205, as described herein. The memory devices 240 may include one or more memory devices as described with reference to FIG. 1. For example, the memory devices 240 may include NAND memory, PCM, self-selecting memory, 3D cross point, other chalcogenide-based memories, FERAM, MRAM, NOR (e.g., NOR flash) memory, STT-MRAM, CBRAM, RRAM, or OxRAM.

The memory system 210 may include a storage controller 230 for controlling the passing of data directly to and from the memory devices 240, e.g., for storing data, retrieving data, and determining memory locations in which to store data and from which to retrieve data. The storage controller 230 may communicate with memory devices 240 directly or via a bus 275 (e.g., ONFI bus) using a protocol specific to each type of memory device 240. In some cases, a single storage controller 230 may be used to control multiple memory devices 240 of the same or different types. In some cases, the memory system 210 may include multiple storage controllers 230, e.g., a different storage controller 230 for each type of memory device 240. In some cases, a storage controller 230 may implement aspects of a local controller 135 as described with reference to FIG. 1.

The memory system 210 may additionally include an interface 220 for communication with the host system 205 and a buffer 225 for temporary storage of data being transferred between the host system 205 and the memory devices 240. The interface 220, buffer 225, and storage controller 230 may be for translating data between the host system 205 and the memory devices 240, e.g., as shown by a data path 250, and may be collectively referred to as data path components.

Using the buffer 225 to temporarily store data during transfers may allow data to be buffered as commands are being processed, thereby reducing latency between commands and allowing arbitrary data sizes associated with commands. This may also allow bursts of commands to be handled, and the buffered data may be stored or transmitted (or both) once a burst has stopped. The buffer 225 may include relatively fast memory (e.g., some types of volatile memory, such as SRAM or DRAM) or hardware accelerators or both to allow fast storage and retrieval of data to and from the buffer 225. The buffer 225 may include data path switching components for bi-directional data transfer between the buffer 225 and other components.

The temporary storage of data within a buffer 225 may refer to the storage of data in the buffer 225 during the execution of access commands. That is, upon completion of an access command, the associated data may no longer be maintained in the buffer 225 (e.g., may be overwritten with data for additional access commands). In addition, the buffer 225 may be a non-cache buffer. That is, data may not be read directly from the buffer 225 by the host system 205. For example, read commands may be added to a queue without an operation to match the address to addresses already in the buffer 225 (e.g., without a cache address match or lookup operation).

The memory system 210 may additionally include a memory system controller 215 for executing the commands received from the host system 205 and controlling the data path components in the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, and a storage queue 270) may be used to control the processing of the access commands and the movement of the corresponding data. This may be beneficial, e.g., if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if used, may be positioned anywhere within the memory system 210.

Data transferred between the host system 205 and the memory devices 240 may take a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220, e.g., according to a protocol (e.g., a UFS protocol or an eMMC protocol). Thus, the interface 220 may be considered a front end of the memory system 210. Upon receipt of each access command, the interface 220 may communicate the command to the memory system controller 215, e.g., via the bus 235. In some cases, each command may be added to a command queue 260 by the interface 220 to communicate the command to the memory system controller 215.

The memory system controller 215 may determine that an access command has been received based on the communication from the interface 220. In some cases, the memory system controller 215 may determine the access command has been received by retrieving the command from the command queue 260. The command may be removed from the command queue 260 after it has been retrieved therefrom, e.g., by the memory system controller 215. In some cases, the memory system controller 215 may cause the interface 220, e.g., via the bus 235, to remove the command from the command queue 260.

Upon the determination that an access command has been received, the memory system controller 215 may execute the access command. For a read command, this may mean obtaining data from the memory devices 240 and transmitting the data to the host system 205. For a write command, this may mean receiving data from the host system 205 and moving the data to the memory devices 240.

In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may first determine if the buffer 225 has sufficient available space to store the data associated with the command. For example, the memory system controller 215 may determine, e.g., via firmware (e.g., controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. That is, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), e.g., according to a protocol (e.g., a UFS protocol or an eMMC protocol). As the interface 220 subsequently receives from the host system 205 the data associated with the write command, the interface 220 may transfer the data to the buffer 225 for temporary storage using the data path 250. In some cases, the interface 220 may obtain from the buffer 225 or buffer queue 265 the location within the buffer 225 to store the data. The interface 220 may indicate to the memory system controller 215, e.g., via the bus 235, if the data transfer to the buffer 225 has been completed.

Once the write data has been stored in the buffer 225 by the interface 220, the data may be transferred out of the buffer 225 and stored in a memory device 240. This may be done using the storage controller 230. For example, the memory system controller 215 may cause the storage controller 230 to retrieve the data out of the buffer 225 using the data path 250 and transfer the data to a memory device 240. The storage controller 230 may be considered a back end of the memory system 210. The storage controller 230 may indicate to the memory system controller 215, e.g., via the bus 235, that the data transfer to a memory device of the memory devices 240 has been completed.

In some cases, a storage queue 270 may be used to aid with the transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain from the buffer 225, buffer queue 265, or storage queue 270 the location within the buffer 225 from which to obtain the data. The storage controller 230 may manage the locations within the memory devices 240 to store the data (e.g., performing wear-leveling, garbage collection, and the like). The entries may be added to the storage queue 270, e.g., by the memory system controller 215. The entries may be removed from the storage queue 270, e.g., by the storage controller 230 or memory system controller 215 upon completion of the transfer of the data.

To process a read command received from the host system 205, the memory system controller 215 may again first determine if the buffer 225 has sufficient available space to store the data associated with the command. For example, the memory system controller 215 may determine, e.g., via firmware (e.g., controller firmware), an amount of space within the buffer 225 that may be available to store data associated with the read command.

In some cases, the buffer queue 265 may be used to aid with buffer storage of data associated with read commands in a similar manner as discussed above with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215, e.g., via the bus 235, when the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain from the buffer 225 or storage queue 270 the location within the memory devices 240 from which to retrieve the data. In some cases, the storage controller 230 may obtain from the buffer queue 265 the location within the buffer 225 to store the data. In some cases, the storage controller 230 may obtain from the storage queue 270 the location within the buffer 225 to store the data. In some cases, the memory system controller 215 may move the command processed by the storage queue 270 back to the command queue 260.

Once the data has been stored in the buffer 225 by the storage controller 230, the data may be transferred out of the buffer 225 and sent to the host system 205. For example, the memory system controller 215 may cause the interface 220 to retrieve the data out of the buffer 225 using the data path 250 and transmit the data to the host system 205, e.g., according to a protocol (e.g., a UFS protocol or an eMMIC protocol). For example, the interface 220 may process the command from the command queue 260 and may indicate to the memory system controller 215, e.g., via the bus 235, that the data transmission to the host system 205 has been completed.

The memory system controller 215 may execute received commands according to an order (e.g., a first-in, first-out order, according to the order of the command queue 260). For each command, the memory system controller 215 may cause data corresponding to the command to be moved into and out of the buffer 225, as discussed above. As the data is moved into and stored within the buffer 225, the command may remain in the buffer queue 265. A command may be removed from the buffer queue 265, e.g., by the memory system controller 215, if the processing of the command has been completed (e.g., if data corresponding to the access command has been transferred out of the buffer 225). If a command is removed from the buffer queue 265, the address previously storing the data associated with that command may be available to store data associated with a new command.

The memory system controller 215 may additionally be configured for operations associated with the memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. That is, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the above operations in conjunction with or instead of the memory system controller 215. In some cases, the memory system controller 215 may perform the functions of the storage controller 230 and the storage controller 230 may be omitted.

In some examples, the system 200 may include one or more clocks for various subcomponents. For example, a memory die of a memory device 240 may be associated with an interface clock, the memory system controller 215 may include a processor (e.g., a CPU) that is associated with a CPU clock, and a datapath (e.g., including interface 220, buffer 225, and storage controller 230) may be associated with a system clock. The rate at which the clocks operate (e.g., the frequency of the clocks) may be set or adjusted by the memory system controller 215. For example, the system 200 may receive one or more commands from the host system 205. Upon receiving the commands, the memory system controller 215 may determine a throughput of the commands, which may be calculated using various factors as described herein. Based on the calculated throughput, the memory system controller 215 may maintain or adjust (e.g., upward or downward) the rate of any one clock or of multiple clocks. Adjusting the rate of the clock(s) based on the calculated throughput may result in saving power that may otherwise be incurred due to clocks operating at unnecessarily high rates.

Figure 3:
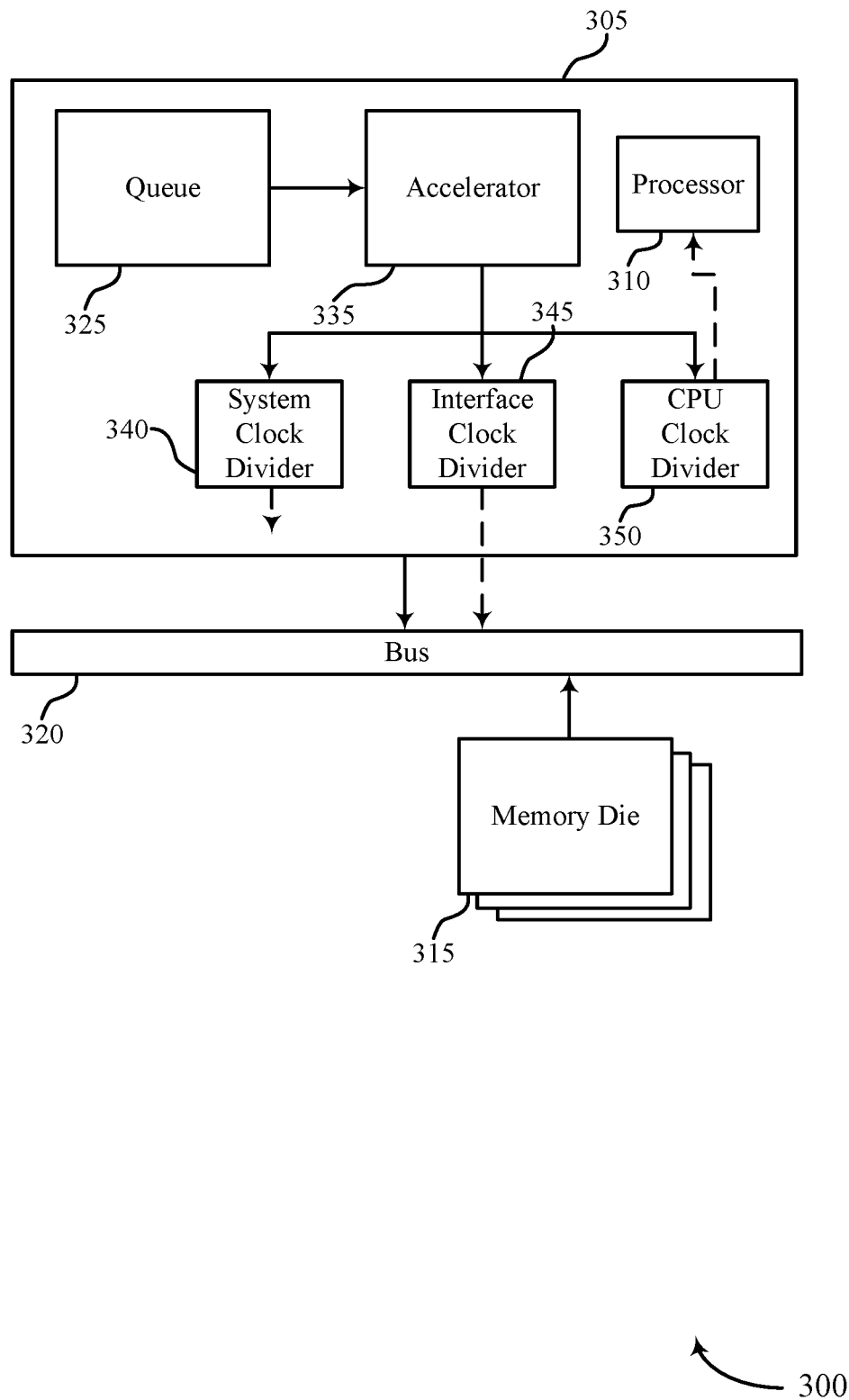
FIG. 3 illustrates an example of a memory system that supports adaptive throughput monitoring in accordance with examples as disclosed herein.

FIG. 3 illustrates an example of a memory system 300 that supports adaptive throughput monitoring in accordance with examples as disclosed herein. The memory system 300 may include a controller 305 (e.g., a memory controller 305), a processor 310 (e.g., a CPU 310), and one or more memory die 315. The controller 305 and the memory dice 315 may be coupled with a bus 320, which may be an example of an ONFI bus 320. The processor 310 may be included in or associated with a firmware layer of the controller 305. Moreover, the controller 305 and memory dice 315 may be examples of the memory system controller 215 and the memory devices 240 as described with reference to FIG. 2.

Additionally or alternatively, the controller 305 may include a queue 325, an accelerator 335, a system clock divider 340, an interface clock divider 345, and a CPU clock divider 350. As described herein, the accelerator 335 may be configured to determine a throughput associated with commands received from a host device. Based on the determined throughput, the system clock divider 340, interface clock divider 345, and CPU clock divider 350 may be configured to adjust a rate (e.g., a clock rate) of respective clocks of the memory system 300. Adjusting the rates of the respective clocks based on the throughput of received commands may result in the memory system 300 saving power, among other benefits, that would otherwise be incurred due to the clocks operating at unnecessarily high rates.

In some examples, the memory system 300 may be coupled with a host system (e.g., a host system 205 as described with reference to FIG. 2). The host system may transmit commands (e.g., access commands) to the memory system 300, which may be received by an interface (not shown). As described with reference to FIG. 2, the commands may be received by the interface according to a protocol (e.g., a UFS protocol or an eMMC protocol). In some cases, each received command may be added to a command queue 325 by the interface, and the commands may be communicated to the accelerator 335 for determining a throughput of the commands.

The host system may be configured to set particular bandwidth requirements. For example, the host system may be configured to set the speed at which it communicates with the memory system 300. In some instances, the host system may be configured to set its bandwidth requirements at different gears (e.g., speeds) ranging from G1 to G4. When operating in G4, the host system may have relatively high bandwidth requirements and thus may communicate with the memory system 300 at a relatively high rate. Additionally or alternatively, when operating in G1, the host system may have relatively low bandwidth requirements and thus may communicate with the memory system 300 at a relatively low rate. As described herein, despite the host system setting a bandwidth requirement, the accelerator 335 may adjust the rate(s) of one or more clocks based on the throughput of received commands, which may reduce the overall power consumption of the memory system 300.

In some instances, the accelerator 335 may determine the throughput of received commands when operating in an analysis mode (e.g., a second mode). The memory system 300 may operate in different modes (e.g., different states) based on whether the queue 325 includes any commands. For example, the memory system 300 may operate in the analysis mode, a low power mode, an idle mode (e.g., a first mode), or another mode (e.g., a third mode). The memory system 300 may enter an idle mode when the queue 325 is empty, and the memory system 300 may transition to an analysis mode when the queue 325 includes one or more commands. In some examples, the memory system 300 may transition to an analysis mode from any other mode (e.g., from a low power mode, an idle mode, etc.). When operating in an analysis mode, the accelerator 335 may not have enough information to change the memory system 300 (or a specific clock of the memory system 300) to a particular power profile. Accordingly, the memory system 300 may operate in the analysis mode until the accelerator 335 is able to reach a decision about the power profile(s).

When operating in the analysis mode, the accelerator 335 may calculate a throughput of the commands received from the host system. As used herein, determining the "throughput" of received commands may refer to determining a quantity of commands received during a duration, determining a type of one or more of the commands received, determining a quantity of data associated with one or more of the commands received, determining a depth of the queue 325, determining an address of one or more of the commands received, or a combination thereof.

For example, the accelerator 335 may determine a throughput of received commands by determining a quantity of commands received during a duration. For example, the accelerator 335 (or another component of the controller 305) may initiate a timer upon transitioning to the analysis mode. The accelerator 335 may then determine a quantity of commands received before the expiration of the timer. Based on the throughput (e.g., the quantity of commands), the accelerator 335 may adjust the rate of one or more clocks of the memory system 300.

Additionally or alternatively, the accelerator may determine a throughput of received commands by determining a type of one or more of the commands received. For example, the accelerator 335 may adjust the rate of one or more clocks of the memory system 300 based on the commands being read commands, write commands, random read commands, random write commands, or a mixed workload.

Additionally or alternatively, the accelerator may determine a throughput of received commands by determining a quantity of data associated with one or more of the commands received. For example, the accelerator may determine a quantity of data associated with each received command and, based on the quantity of data, may adjust the rate of one or more clocks of the memory system 300.

Additionally or alternatively, the accelerator may determine a throughput of received commands by determining a quantity of commands in the queue 325. For example, the accelerator may determine the quantity of commands in the queue 325 and, based on the quantity of commands, may adjust the rate of one or more clocks of the memory system 300.

Additionally or alternatively, the accelerator may determine a throughput of received commands by determining an address of one or more received commands. For example, the accelerator may determine that the address(es) is associated with a particular process or a particular memory die 315 and, based on the address, may adjust the rate of one or more clocks of the memory system 300.

In some instances, the memory system 300 may include different clocks that are associated with respective subcomponents of the memory system 300. In some examples, the controller 305 (or another component) may include an oscillator (e.g., voltage controlled oscillator (VCO) or phase locked loop (PLL)) to generate a clock for the memory system 300, or the memory system 300 may receive a clock from the host. The controller 305 may include respective dividers that set different frequencies for the subcomponents. For example, the controller 305 may include a system clock divider 340 that is configured to set a frequency (e.g., a rate) for a datapath to the memory dice 315 that is within the memory system 300. The controller 305 may also include an interface clock divider 345 that is configured to set a frequency (e.g., a rate) for the bus 320 and a CPU clock divider 350 that is configured to set a frequency (e.g., a rate) for the processor 310, which may manage commands in the queue 325. Although FIG. 3 illustrates the memory system 300 including three (3) clock dividers, the memory system 300 may include any quantity of clock dividers that are associated with the clocks for respective subcomponents.

To set or adjust the rate(s) of the clocks of the memory system 300, the accelerator 335 may communicate with the respective clock dividers. Additionally or alternatively, the accelerator 335 may store or have access to a table, such as Table 1 that is reproduced below. The table may include categories of commands that are associated with indexed ranges of clock rates. For example, the accelerator 335 may, upon receiving a plurality of commands, categorize the commands into one or more categories as shown below.

TABLE 1

|  | CMD | DATA-IN | DATA-OUT | QD | Threshold X (MB/s) | CPU | ONFI | SYS |
|---|---|---|---|---|---|---|---|---|
| ANALYSIS state | NA | NA | NA | NA | >2000 | 500 (max) | 800 (max) | 400 (max) |
| RD Seq high | 20 |  | 262144 | 4 | 1800 >= X <= 2000 | 300 | 800 | 400 |
| WR Seq high | 10 | 524288 |  | 4 | 1200 >= X <= 1600 | 400 | 400 | 200 |
| Random read high | 20 | 0 | 131072 | 32 |  | 500 | 600 | 200 |
| Random read low | 10 | 0 | 33576 | 8 |  | 300 | 400 | 200 |

TABLE 1-continued

|  | CMD | DATA-IN | DATA-OUT | QD | Threshold X (MB/s) | CPU | ONFI | SYS |
|---|---|---|---|---|---|---|---|---|
| Random Wr high | 20 | 131073 | 0 | 8 |  | 500 | 400 | 300 |
| Random Wr low | 10 | 4096 | 0 | 1 |  | 300 | 400 | 200 |
| Mixed workload high | 32 | 131072 | 65536 |  | 1600 >= X <= 1800 | 500 | 800 | 400 |
| Idle | 0 | 0 | 0 | 0 |  | 300 | 400 | 200 |
| Low | 0 | 0 | 0 | 0 | 0 | 200 | 0 | 0 |

By way of example, upon receiving a plurality of commands, the memory system 300 may transition into an analysis mode. When operating in the analysis mode, the system clock divider 340, the interface clock divider 345, and the CPU clock divider 350 may set the respective clocks to the maximum rates as shown in Table 1 (e.g., 500, 800, 400, respectively). The accelerator 335 may then categorize the commands into one or more categories such as read, write, random read, random write, etc. as shown in Table 1. Then, the accelerator 335 may calculate the throughput using one of the criteria described herein (e.g., a quantity of commands received during a duration, a type of one or more of the commands received, etc.).

Based on the category (or categories) of received commands and the calculated throughput, the accelerator 335 may select an index (e.g., from an indexed range) that corresponds to a rate for each of the clocks. For example, the received commands may be categorized as random reads and the throughput of the commands (e.g., of the random reads) may be calculated. Using such an example, the system clock divider 340, the interface clock divider 345, and the CPU clock divider 350 may set the respective clocks to either 500, 600, and 200 or 300, 400, and 200 based on the calculated throughput. In some instances, the received commands may fall into more than one category. Accordingly, in such examples, the accelerator 335 may select an index (for each respective clock) that corresponds to a highest rate for the clock from among the more than one category.

Additionally or alternatively, each clock may be associated with an indexed range of frequencies (e.g., an indexed range of clock rates). Each indexed range of frequencies may include a same quantity of clock frequencies, but a different index may be selected for at least one clock (or each clock) in one or more categories. Accordingly, the system clock divider 340, the interface clock divider 345, and the CPU clock divider 350 may set the respective frequencies based on the calculated throughput.

In some examples, the rates of the clocks may also be adjusted based on a quantity of maintenance operations to be performed on the memory system 300. For example, when the memory system 300 is idle (e.g., operating in an idle mode, a first mode), the memory controller 305 may determine a quantity of garbage collection operations to be performed on the memory dice 315. Depending on the quantity, the rate of one or more clocks may be adjusted (e.g., adjusted upward or downward). For example, if a relatively low quantity of garbage collection operations are to be performed then the rate of one or more clocks may be maintained or lowered (e.g., adjusted downward). Moreover, if a relatively large quantity of garbage collection operations are to be performed then the rate of one or more clocks may be increased (e.g., adjusted upward), which may increase the bandwidth of the memory system 300. Accordingly, by adjusting the rate(s) of one or more clocks of the memory system 300 based on a throughput of received commands or garbage collection operations, the memory system 300 may save power, among other benefits, that would otherwise be incurred due to the clocks operating at unnecessarily high rates.

Figure 4:
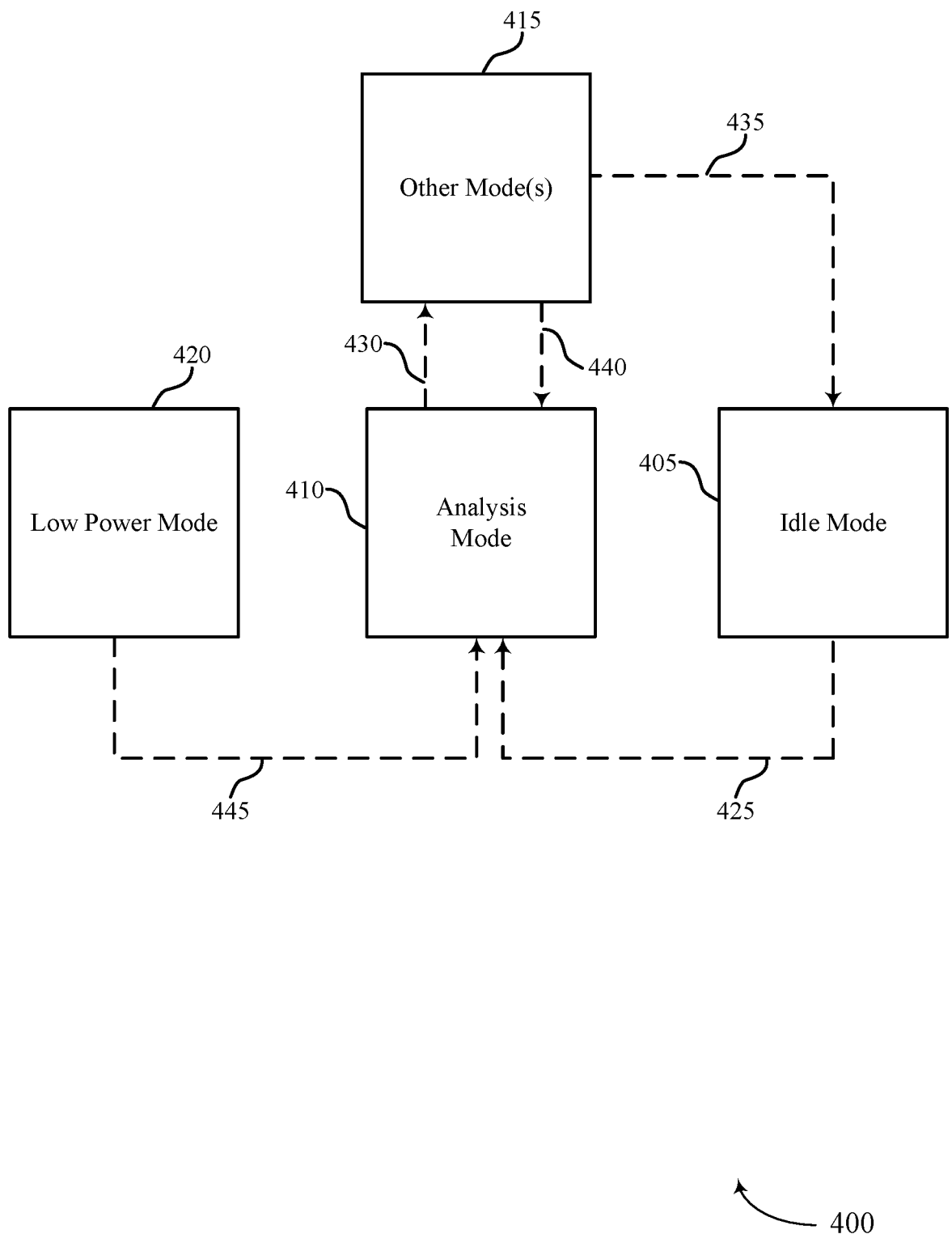
FIG. 4 illustrates an example of a block diagram that supports adaptive throughput monitoring in accordance with examples as disclosed herein.

FIG. 4 illustrates an example of a block diagram 400 that supports adaptive throughput monitoring in accordance with examples as disclosed herein. The block diagram 400 may illustrate different operating modes of a memory system (e.g., a memory system 300 as described with reference to FIG. 3). For example, the block diagram 400 may illustrate an idle mode 405, an analysis mode 410, other mode(s) 415, and a low power mode 420. Moreover, the block diagram 400 may illustrate transitioning between the different modes. Based on the mode an associated memory system is operating in, the rates of respective clocks may be adjusted based on the throughput of received commands, which may result in the memory system saving power that would otherwise be incurred due to the clocks operating at unnecessarily high rates.

In some examples, a memory system may operate in an idle mode 405. A memory system may operate in an idle mode 405 based on an absence of commands received from a host system (e.g., a host system 205 as described with reference to FIG. 2) for a duration. In other words, when a queue (e.g., a queue 325 as described with reference to FIG. 2) is empty (e.g., when its depth is equal to zero (0)), the memory system may operate in an idle mode 405.

At 425, the memory system may transition from an idle mode 405 to an analysis mode. The memory system may transition based on receiving one or more commands from a host system. In some instances, the transition at 425 may occur based on a single command being stored to a queue of the memory system (e.g., when the queue depth is greater than zero (0)).

When operating in an analysis mode 410, the memory system (e.g., the accelerator 335 of the memory system 300 as described with reference to FIG. 3) may not have enough information to adjust a rate of any clocks. Accordingly, the memory system may operate in the analysis mode 410 until the accelerator is able to reach a decision about the rates to set particular clocks to. As described herein, when in the analysis mode 410, the accelerator may determine a throughput of received commands. While determining the throughput of received commands, the rates of the clocks of the memory system may be set to a relatively high (or maximum) rate to anticipate that the ensuring power profile will require high bandwidth. In some instances, the accelerator may calculate a throughput of received commands for an interval (e.g., for a duration), which may be configurable. Upon determining the throughput of the received commands, the accelerator may adjust the rate of one or more clocks, and the memory system may transition to another mode (e.g., illustrated as other modes 415).

At 430, the memory system may transition from an analysis mode 410 to another mode (e.g., illustrated as other modes 415). The other modes 415 may correspond to one or more of the categories shown in Table 1. Thus transitioning to the other modes 415 may, in effect, set a clock rate for a respective clock (or clocks). In some instances, a pattern of commands may be categorized into more than one category. Accordingly, in such examples, each clock may be set at highest rate from any of the more than one categories. Additionally or alternatively, the rate for at least one clock may be set according to a category (e.g., a single category) and the rate for other clocks whose rate is higher in another category for which the pattern of commands is categorized may be increased accordingly.

While operating in the other modes 415, the memory system may process commands received from a host system, and the rate of its clocks may be maintained at the rate(s) set by the category or categories associated with the other modes 415. In some instances, the memory system may continue operating in this mode until it transitions to the idle mode 405 or back to the analysis mode 410. For example, at 435 the memory system may transition to the idle mode 405 based on the queue being empty.

Additionally or alternatively, at 440 the memory system may transition to the analysis mode based on receiving a different pattern of commands. For example, the accelerator may set a rate of one or more clocks based on receiving a plurality of read commands. However, after transitioning from the analysis mode 410 the memory system may receive a plurality of write commands. Accordingly, the memory system may continue analyzing received commands in other modes 415. If the category for the clocks changes, the memory system may transition directly from one category to another, and thus the accelerator may adjust the rate(s) of the clock(s).

Additionally or alternatively, a memory system may operate in a low power mode 420. A memory system may operate in low power mode 420 based on a command received from a host system (e.g., a hibernate command, a sleep command, etc.). Accordingly, when operating in a low power mode 420 a memory system may receive relatively few or no commands from the host system for a duration. At 445, the memory system may transition from the low power mode 420 to the analysis mode 410. The memory system may transition based on receiving one or more commands from the host system. In some instances, the transition at 445 may occur based on a single command being stored to a queue of the memory system (e.g., when the queue depth is greater than zero (0)).

Accordingly, the various modes described with reference to FIG. 4 may be used in connection with adjusting the rate(s) of one or more clocks of a memory system based on a throughput of received commands. As such, the memory system may save power, among other benefits, that would otherwise be incurred due to the clocks operating at unnecessarily high rates.

Figure 5:
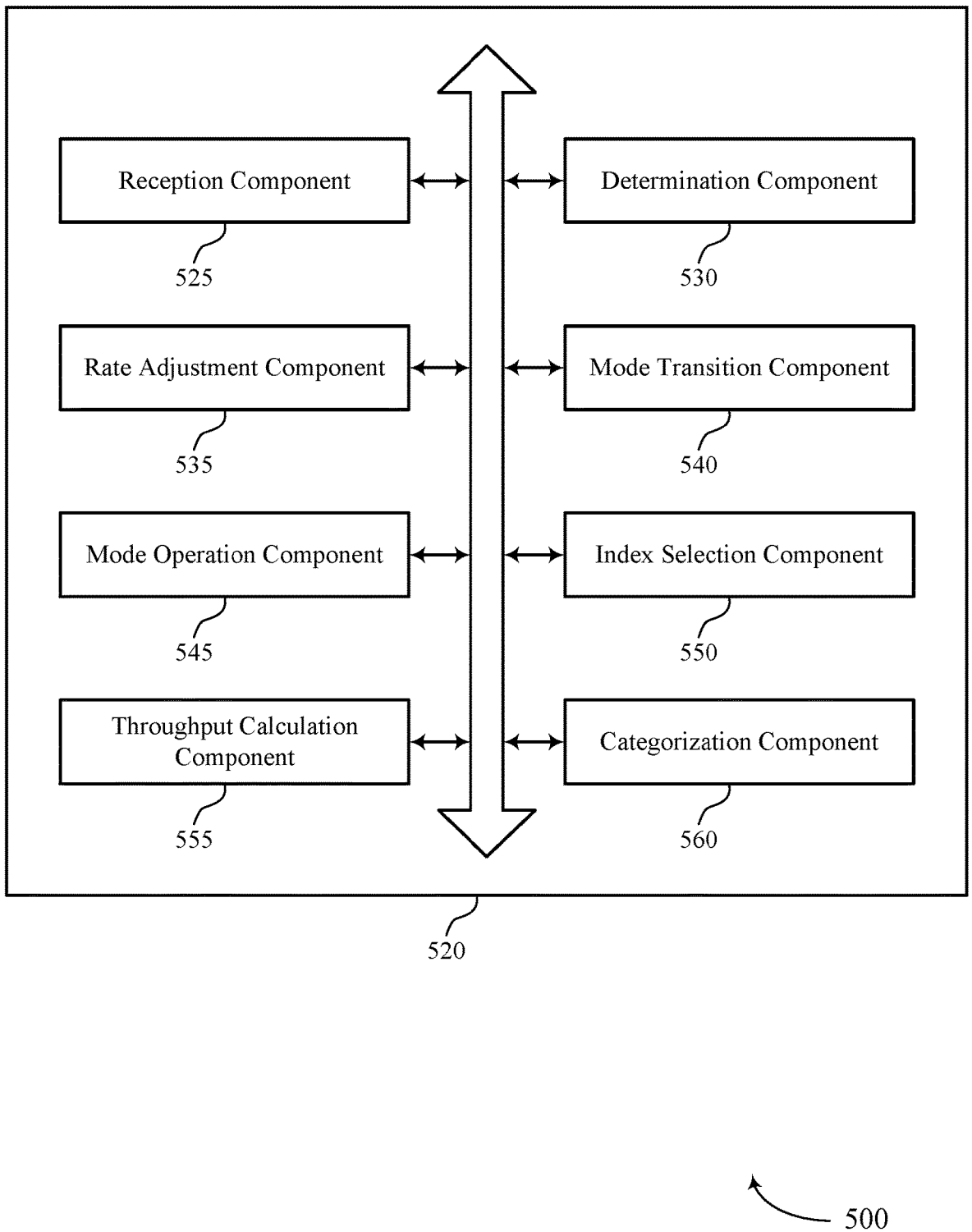
FIG. 5 shows a block diagram of a memory system that supports adaptive throughput monitoring in accordance with examples as disclosed herein.

FIG. 5 shows a block diagram 500 of a memory system 520 that supports adaptive throughput monitoring in accordance with examples as disclosed herein. The memory system 520 may be an example of aspects of a memory system as described with reference to FIGS. 1 through 4. The memory system 520, or various components thereof, may be an example of means for performing various aspects of adaptive throughput monitoring as described herein. For example, the memory system 520 may include a reception component 525, a determination component 530, a rate adjustment component 535, a mode transition component 540, a mode operation component 545, an index selection component 550, a throughput calculation component 555, a categorization component 560, or any combination thereof. Each of these components may communicate, directly or indirectly, with one another (e.g., via one or more buses).

The reception component 525 may be configured as or otherwise support a means for receiving, at a controller of a non-volatile memory device, a plurality of commands, where the non-volatile memory device includes a plurality of clocks, each of the plurality of clocks associated with a respective subcomponent of the non-volatile memory device. In some examples, the reception component 525 may be configured as or otherwise support a means for receiving, at a memory device, a command while the memory device is operating in an idle mode, where the memory device includes a plurality of clocks, and where each of the plurality of clocks is associated with a respective subcomponent of the memory device.

In some examples, the reception component 525 may be configured as or otherwise support a means for receiving the plurality of commands while the memory device is operating in the analysis mode.

The determination component 530 may be configured as or otherwise support a means for determining a throughput of the plurality of commands based at least in part on receiving the plurality of commands. In some examples, the determination component 530 may be configured as or otherwise support a means for determining a quantity of maintenance operations to be performed on the non-volatile memory device while the non-volatile memory device is operating in a first mode. In some examples, to support determining the throughput of the plurality of commands, the determination component 530 may be configured as or otherwise support a means for determining that a subset of the plurality of commands is associated with a first category of the one or more categories and a second category of the one or more categories based at least in part on categorizing the plurality of commands.

In some examples, the determination component 530 may be configured as or otherwise support a means for determining whether one or more characteristics of a plurality of commands received while the memory device is operating in the analysis mode satisfy a threshold value. In some examples, the determination component 530 may be configured as or otherwise support a means for determining that a first subset of the plurality of received commands satisfies the threshold value. In some examples, the determination component 530 may be configured as or otherwise support a means for determining that a second subset of the plurality of received commands satisfies a second threshold value.

The rate adjustment component 535 may be configured as or otherwise support a means for adjusting a rate of at least one of the plurality of clocks based at least in part on determining the throughput of the plurality of commands. In some examples, the rate adjustment component 535 may be configured as or otherwise support a means for adjusting the rate of each of the plurality of clocks to a first rate based at least in part on transitioning from the first mode to the second mode. In some the rate adjustment component 535 may be configured as or otherwise support a means for adjusting the rate of at least one of the plurality of clocks to a second rate that is lower than the first rate based at least in part on determining the throughput of the plurality of commands.

In some examples, the rate adjustment component 535 may be configured as or otherwise support a means for adjusting the rate of at least one of the plurality of clocks based at least in part on determining the quantity of maintenance operations to be performed on the non-volatile memory device. In some examples, the rate adjustment component 535 may be configured as or otherwise support a means for adjusting a rate of at least one of the plurality of clocks based at least in part on determining that the one or more characteristics of the plurality of commands received while the memory device is operating in the analysis mode satisfies the threshold value.

In some examples, the rate of each of the plurality of clocks is set to a first rate while the memory device is operating in the analysis mode, and the rate adjustment component 535 may be configured as or otherwise support a means for adjusting the rate of at least one of the plurality of clocks to a second rate that is lower than the first rate based at least in part on determining the one or more characteristics of the plurality of commands received while the memory device is operating in the analysis mode satisfies the threshold value. In some examples, the rate adjustment component 535 may be configured as or otherwise support a means for adjusting the rate of at least one of the plurality of clocks to a third rate based at least in part on determining that the first subset of the plurality of received commands satisfies the threshold value and determining that the second subset of the plurality of received commands satisfies the second threshold value, where the threshold value is associated with the third rate and the second threshold value is associated with a fourth rate that is lower than the third rate.

In some examples, the mode transition component 540 may be configured as or otherwise support a means for transitioning the non-volatile memory device from the first mode to a second mode based at least in part on receiving at least one of the plurality of commands. The mode transition component 540 may be configured as or otherwise support a means for transitioning the memory device from the idle mode to an analysis mode based at least in part on receiving the command.

In some examples, the rate of each of the plurality of clocks is set to a first rate while the memory device is operating in the analysis mode, and the mode transition component 540 may be configured as or otherwise support a means for transitioning the memory device from the analysis mode to a mode different than the idle mode based at least in part on adjusting the rate of at least one of the plurality of clocks to the second rate.

In some examples, the mode operation component 545 may be configured as or otherwise support a means for operating the non-volatile memory device in a first mode prior to receiving the plurality of commands. In some examples, the mode operation component 545 may be configured as or otherwise support a means for operating the non-volatile memory device in a third mode after adjusting the rate of at least one of the plurality of clocks to the second rate.

In some examples, to support adjusting the rate of at least one of the plurality of clocks, the index selection component 550 may be configured as or otherwise support a means for selecting, for the first clock, a first index from the first indexed range that corresponds to a third rate. In some examples, to support adjusting the rate of at least one of the plurality of clocks, the index selection component 550 may be configured as or otherwise support a means for selecting, for the second clock, a second index from the second indexed range that corresponds to a fourth rate. In some examples, to support adjusting the rate of at least one of the plurality of clocks, the index selection component 550 may be configured as or otherwise support a means for selecting, for the third clock, a third index from the third indexed range that corresponds to a fifth rate.

In some examples, to support determining the throughput of the plurality of commands, the index selection component 550 may be configured as or otherwise support a means for selecting, for a respective clock of the plurality of clocks, an index from a fourth index associated with the first category and a fifth index associated with the second category that corresponds to highest rate for the respective clock.

In some examples, the throughput calculation component 555 may be configured as or otherwise support a means for calculating a throughput of the plurality of received commands based at least in part on the one or more characteristics, where adjusting the rate of at least one of the plurality of clocks is based at least in part on the calculated throughput.

In some examples, to support determining the throughput of the plurality of commands, the categorization component 560 may be configured as or otherwise support a means for categorizing the plurality of commands into one or more categories based at least in part on a characteristic associated with each of the plurality of commands, where the one or more categories are each associated with a respective index from the first indexed range, the second indexed range, or the third indexed range.

In some examples, a first clock of the plurality of clocks is associated with a data path of the non-volatile memory device, a second clock of the plurality of clocks is associated with a processor of the non-volatile memory device, and a third clock of the plurality of clocks is associated with a data bus coupled with the non-volatile memory device. In some examples, determining the throughput of the plurality of commands includes determining a quantity of the plurality of commands received during a duration, determining a type of one or more of the plurality of commands received, determining a quantity of data associated with one or more of the plurality of commands received, determining a depth of a queue that includes one or more of the plurality of commands received, determining an address of one or more of the plurality of commands received, or a combination thereof.

In some examples, the one or more characteristics include a quantity of the plurality of commands received during a duration, a type of one or more of the plurality of received commands, a quantity of data associated with one or more of the plurality of received commands, a depth of a queue that includes one or more of the plurality of received commands, an address of one or more of the plurality of received commands, or a combination thereof. In some examples, a first clock of the plurality of clocks is associated with a data path of the memory device, a second clock of the plurality of clocks is associated with a processor of the memory device, and a third clock of the plurality of clocks is associated with a data bus coupled with the memory device.

Figure 6:
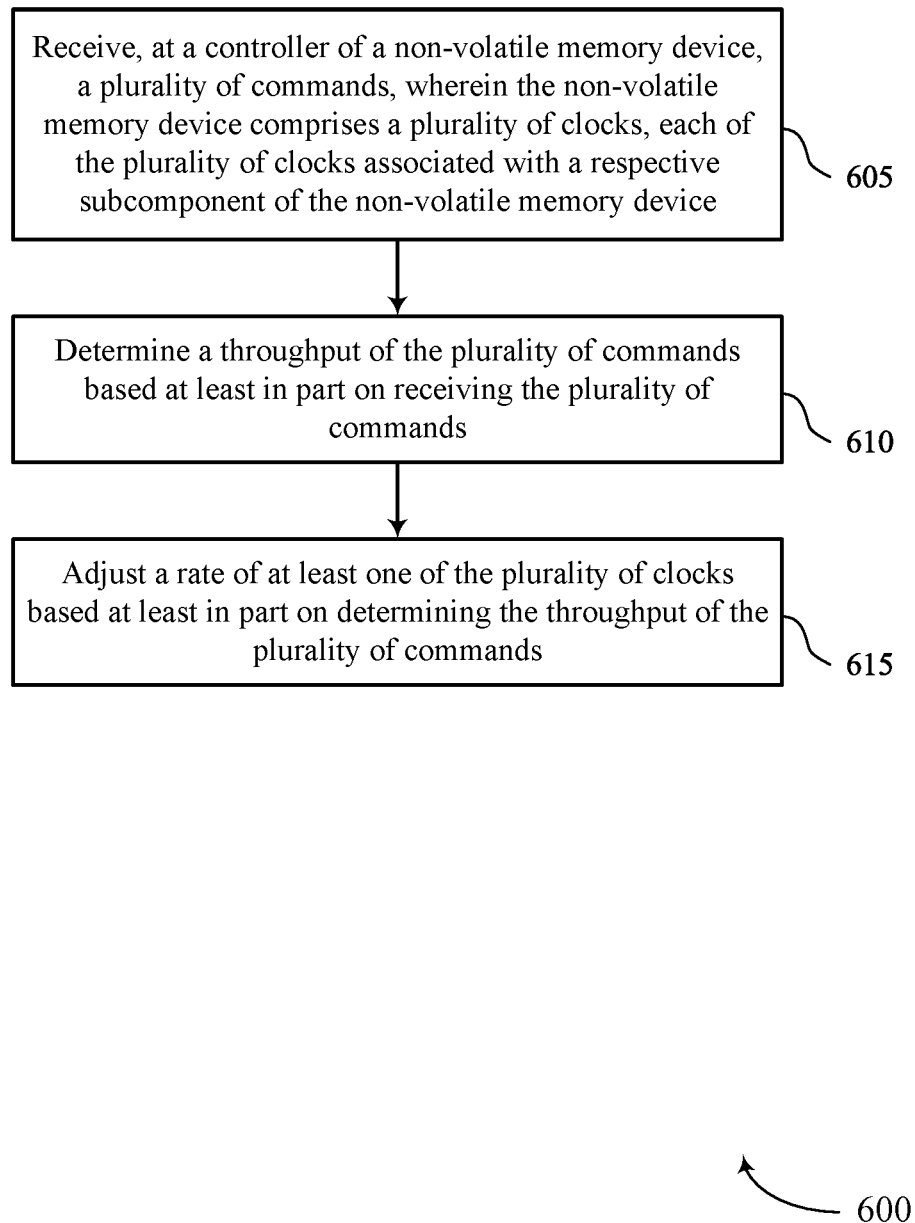
FIGS. 6 and 7 show flowcharts illustrating a method or methods that support adaptive throughput monitoring in accordance with examples as disclosed herein.

FIG. 6 shows a flowchart illustrating a method 600 that supports adaptive throughput monitoring in accordance with examples as disclosed herein. The operations of method 600 may be implemented by a memory system or its components as described herein. For example, the operations of method 600 may be performed by a memory system as described with reference to FIGS. 1 through 5. In some examples, a memory system may execute a set of instructions to control the functional elements of the device to perform the described functions. Additionally or alternatively, the memory system may perform aspects of the described functions using special-purpose hardware.

At 605, the method may include receiving, at a controller of a non-volatile memory device, a plurality of commands, where the non-volatile memory device includes a plurality of clocks, each of the plurality of clocks associated with a respective subcomponent of the non-volatile memory device. The operations of 605 may be performed in accordance with examples as disclosed herein. In some examples, aspects of the operations of 605 may be performed by a reception component 525 as described with reference to FIG. 5.

At 610, the method may include determining a throughput of the plurality of commands based at least in part on receiving the plurality of commands. The operations of 610 may be performed in accordance with examples as disclosed herein. In some examples, aspects of the operations of 610 may be performed by a determination component 530 as described with reference to FIG. 5.

At 615, the method may include adjusting a rate of at least one of the plurality of clocks based at least in part on determining the throughput of the plurality of commands. The operations of 615 may be performed in accordance with examples as disclosed herein. In some examples, aspects of the operations of 615 may be performed by a rate adjustment component 535 as described with reference to FIG. 5.

In some examples, an apparatus as described herein may perform a method or methods, such as the method 600. The apparatus may include, features, circuitry, logic, means, or instructions (e.g., a non-transitory computer-readable medium storing instructions executable by a processor) for receiving, at a controller of a non-volatile memory device, a plurality of commands, where the non-volatile memory device includes a plurality of clocks, each of the plurality of clocks associated with a respective subcomponent of the non-volatile memory device, determining a throughput of the plurality of commands based at least in part on receiving the plurality of commands, and adjusting a rate of at least one of the plurality of clocks based at least in part on determining the throughput of the plurality of commands.

Some examples of the method 600 and the apparatus described herein may further include operations, features, circuitry, logic, means, or instructions for operating the non-volatile memory device in a first mode prior to receiving the plurality of commands, transitioning the non-volatile memory device from the first mode to a second mode based at least in part on receiving at least one of the plurality of commands, and adjusting the rate of each of the plurality of clocks to a first rate based at least in part on transitioning from the first mode to the second mode.

In some examples of the method 600 and the apparatus described herein, and the method, apparatuses, and non-transitory computer-readable medium may include further operations, features, circuitry, logic, means, or instructions for adjusting the rate of at least one of the plurality of clocks to a second rate that may be lower than the first rate based at least in part on determining the throughput of the plurality of commands.

Some examples of the method 600 and the apparatus described herein may further include operations, features, circuitry, logic, means, or instructions for operating the non-volatile memory device in a third mode after adjusting the rate of at least one of the plurality of clocks to the second rate.

Some examples of the method 600 and the apparatus described herein may further include operations, features, circuitry, logic, means, or instructions for determining a quantity of maintenance operations to be performed on the non-volatile memory device while the non-volatile memory device may be operating in a first mode and adjusting the rate of at least one of the plurality of clocks based at least in part on determining the quantity of maintenance operations to be performed on the non-volatile memory device.

In some examples of the method 600 and the apparatus described herein, adjusting the rate of at least one of the plurality of clocks may include operations, features, circuitry, logic, means, or instructions for selecting, for the first clock, a first index from the first indexed range that corresponds to a third rate, selecting, for the second clock, a second index from the second indexed range that corresponds to a fourth rate, and selecting, for the third clock, a third index from the third indexed range that corresponds to a fifth rate.

In some examples of the method 600 and the apparatus described herein, determining the throughput of the plurality of commands may include operations, features, circuitry, logic, means, or instructions for categorizing the plurality of commands into one or more categories based at least in part on a characteristic associated with each of the plurality of commands, where the one or more categories may be each associated with a respective index from the first indexed range, the second indexed range, or the third indexed range.

In some examples of the method 600 and the apparatus described herein, determining the throughput of the plurality of commands may include operations, features, circuitry, logic, means, or instructions for determining that a subset of the plurality of commands may be associated with a first category of the one or more categories and a second category of the one or more categories based at least in part on categorizing the plurality of commands and selecting, for a respective clock of the plurality of clocks, an index from a fourth index associated with the first category and a fifth index associated with the second category that corresponds to highest rate for the respective clock.

In some examples of the method 600 and the apparatus described herein, a first clock of the plurality of clocks may be associated with a data path of the non-volatile memory device, a second clock of the plurality of clocks may be associated with a processor of the non-volatile memory device, and a third clock of the plurality of clocks may be associated with a data bus coupled with the non-volatile memory device.

Some examples of the method 600 and the apparatus described herein may further include operations, features, circuitry, logic, means, or instructions for determining the throughput of the plurality of commands includes determining a quantity of the plurality of commands received during a duration, determining a type of one or more of the plurality of commands received, determining a quantity of data associated with one or more of the plurality of commands received, determining a depth of a queue that includes one or more of the plurality of commands received, determining an address of one or more of the plurality of commands received, or a combination thereof.

Figure 7:
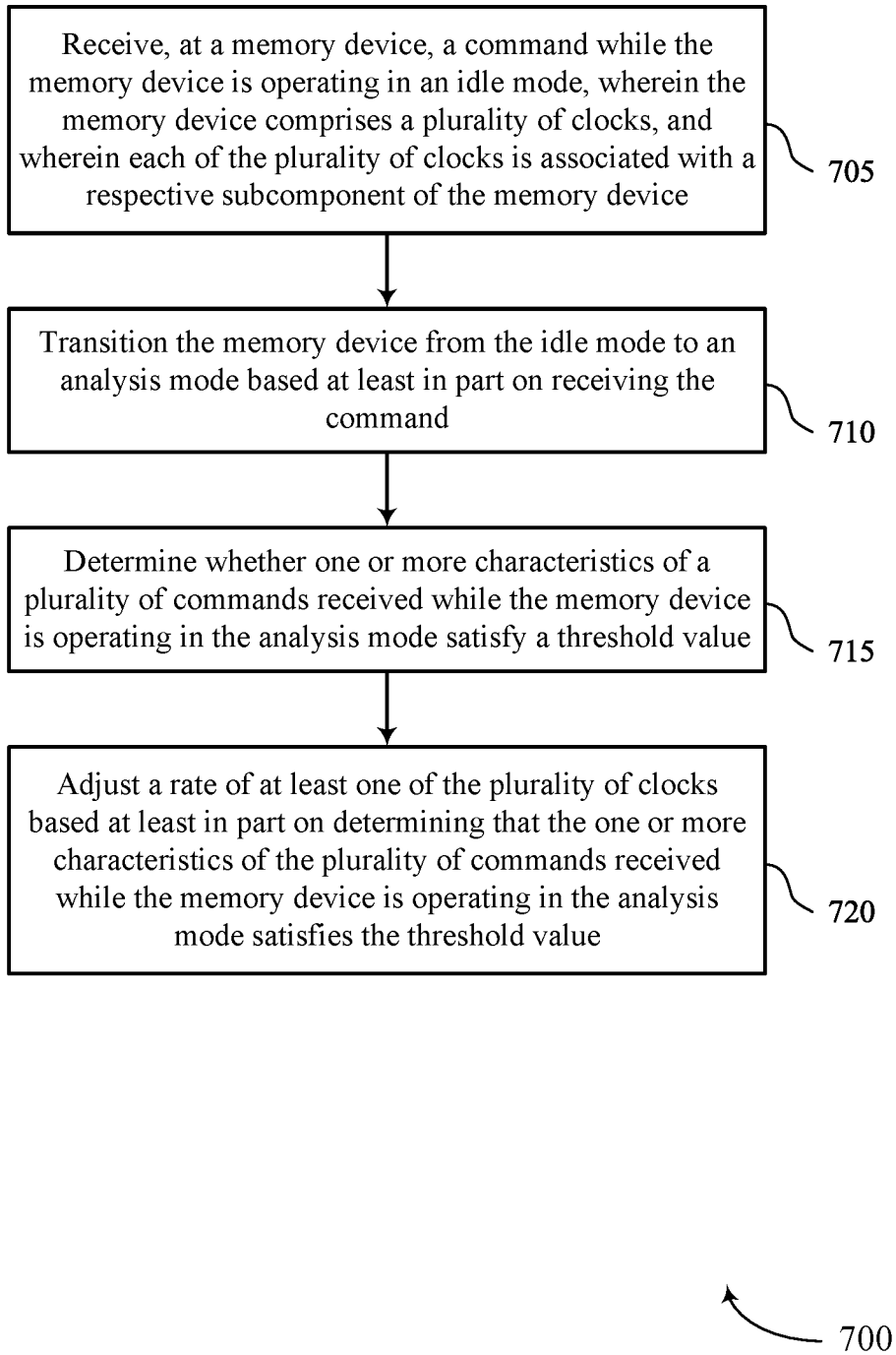

FIG. 7 shows a flowchart illustrating a method 700 that supports adaptive throughput monitoring in accordance with examples as disclosed herein. The operations of method 700 may be implemented by a memory system or its components as described herein. For example, the operations of method 700 may be performed by a memory system as described with reference to FIGS. 1 through 5. In some examples, a memory system may execute a set of instructions to control the functional elements of the device to perform the described functions. Additionally or alternatively, the memory system may perform aspects of the described functions using special-purpose hardware.

At 705, the method may include receiving, at a memory device, a command while the memory device is operating in an idle mode, where the memory device includes a plurality of clocks, and where each of the plurality of clocks is associated with a respective subcomponent of the memory device. The operations of 705 may be performed in accordance with examples as disclosed herein. In some examples, aspects of the operations of 705 may be performed by a reception component 525 as described with reference to FIG. 5.

At 710, the method may include transitioning the memory device from the idle mode to an analysis mode based at least in part on receiving the command. The operations of 710 may be performed in accordance with examples as disclosed herein. In some examples, aspects of the operations of 710 may be performed by a mode transition component 540 as described with reference to FIG. 5.

At 715, the method may include determining whether one or more characteristics of a plurality of commands received while the memory device is operating in the analysis mode satisfy a threshold value. The operations of 715 may be performed in accordance with examples as disclosed herein. In some examples, aspects of the operations of 715 may be performed by a determination component 530 as described with reference to FIG. 5.

At 720, the method may include adjusting a rate of at least one of the plurality of clocks based at least in part on determining that the one or more characteristics of the plurality of commands received while the memory device is operating in the analysis mode satisfies the threshold value. The operations of 720 may be performed in accordance with examples as disclosed herein. In some examples, aspects of the operations of 720 may be performed by a rate adjustment component 535 as described with reference to FIG. 5.

In some examples, an apparatus as described herein may perform a method or methods, such as the method 700. The apparatus may include, features, circuitry, logic, means, or instructions (e.g., a non-transitory computer-readable medium storing instructions executable by a processor) for receiving, at a memory device, a command while the memory device is operating in an idle mode, where the memory device includes a plurality of clocks, and where each of the plurality of clocks is associated with a respective subcomponent of the memory device, transitioning the memory device from the idle mode to an analysis mode based at least in part on receiving the command, determining whether one or more characteristics of a plurality of commands received while the memory device is operating in the analysis mode satisfy a threshold value, and adjusting a rate of at least one of the plurality of clocks based at least in part on determining that the one or more characteristics of the plurality of commands received while the memory device is operating in the analysis mode satisfies the threshold value.

Some examples of the method 700 and the apparatus described herein may further include operations, features, circuitry, logic, means, or instructions for receiving the plurality of commands while the memory device may be operating in the analysis mode and calculating a throughput of the plurality of received commands based at least in part on the one or more characteristics, where adjusting the rate of at least one of the plurality of clocks may be based at least in part on the calculated throughput.

In some examples of the method 700 and the apparatus described herein, the one or more characteristics include a quantity of the plurality of commands received during a duration, a type of one or more of the plurality of received commands, a quantity of data associated with one or more of the plurality of received commands, a depth of a queue that includes one or more of the plurality of received commands, an address of one or more of the plurality of received commands, or a combination thereof.

In some examples of the method 700 and the apparatus described herein, the rate of each of the plurality of clocks may be set to a first rate while the memory device may be operating in the analysis mode and the method, apparatuses, and non-transitory computer-readable medium may include further operations, features, circuitry, logic, means, or instructions for adjusting the rate of at least one of the plurality of clocks to a second rate that may be lower than the first rate based at least in part on determining the one or more characteristics of the plurality of commands received while the memory device may be operating in the analysis mode satisfies the threshold value and transitioning the memory device from the analysis mode to a mode different than the idle mode based at least in part on adjusting the rate of at least one of the plurality of clocks to the second rate.

Some examples of the method 700 and the apparatus described herein may further include operations, features, circuitry, logic, means, or instructions for determining that a first subset of the plurality of received commands satisfies the threshold value, determining that a second subset of the plurality of received commands satisfies a second threshold value, and adjusting the rate of at least one of the plurality of clocks to a third rate based at least in part on determining that the first subset of the plurality of received commands satisfies the threshold value and determining that the second subset of the plurality of received commands satisfies the second threshold value, where the threshold value may be associated with the third rate and the second threshold value may be associated with a fourth rate that may be lower than the third rate.

In some examples of the method 700 and the apparatus described herein, a first clock of the plurality of clocks may be associated with a data path of the memory device, a second clock of the plurality of clocks may be associated with a processor of the memory device, and a third clock of the plurality of clocks may be associated with a data bus coupled with the memory device.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A non-transitory computer-readable medium storing code comprising instructions which, when executed by processing circuitry of a memory system, cause the memory system to:
    store at least one command of a plurality of received commands in a queue while operating the memory system in a first mode, wherein the memory system comprises a plurality of clocks, each of the plurality of clocks associated with a respective subcomponent of the memory system;
    transition the memory system from operating in the first mode to a second mode to determine a throughput of the plurality of received commands based at least in part on storing the at least one command of the plurality of received commands in the queue;
    adjust, while operating in the second mode, a rate of at least one of the plurality of clocks to a maximum rate;
    determine, while operating in the second mode, the throughput of the plurality of received commands based at least in part on the plurality of received commands; and
    adjust a rate of at least one of the plurality of clocks to a second rate lower than the maximum rate based at least in part on determining the throughput of the plurality of received commands.

2. The non-transitory computer-readable medium of claim 1, wherein the instructions, when executed by the processing circuitry of the memory system, further cause the memory system to:
    operate the memory system in a third mode after adjusting the rate of at least one of the plurality of clocks to the second rate.

3. The non-transitory computer-readable medium of claim 1, wherein the instructions, when executed by the processing circuitry of the memory system, further cause the memory system to:
    determine a quantity of maintenance operations to be performed on the memory system while the memory system is operating in the first mode; and
    adjust the rate of at least one of the plurality of clocks based at least in part on determining the quantity of maintenance operations to be performed on the memory system.

4. The non-transitory computer-readable medium of claim 1, wherein, to adjust the rate of at least one of the plurality of clocks, the instructions, when executed by the processing circuitry of the memory system, further cause the memory system to:
    select, for a first clock, a first index from a first indexed range that corresponds to a third rate;
    select, for a second clock, a second index from a second indexed range that corresponds to a fourth rate; and
    select, for a third clock, a third index from a third indexed range that corresponds to a fifth rate.

5. The non-transitory computer-readable medium of claim 4, wherein, to determine the throughput of the plurality of received commands, the instructions, when executed by the processing circuitry of the memory system, further cause the memory system to:
    categorize the plurality of received commands into one or more categories based at least in part on a characteristic associated with each of the plurality of received commands, wherein the one or more categories are each associated with a respective index from the first indexed range, the second indexed range, or the third indexed range.

6. The non-transitory computer-readable medium of claim 5, wherein, to determine the throughput of the plurality of received commands, the instructions, when executed by the processing circuitry of the memory system, further cause the memory system to:
  determine that a subset of the plurality of received commands is associated with a first category of the one or more categories and a second category of the one or more categories based at least in part on categorizing the plurality of received commands; and
  select, for a respective clock of the plurality of clocks, an index from a fourth index associated with the first category and a fifth index associated with the second category that corresponds to highest rate for the respective clock.

7. The non-transitory computer-readable medium of claim 1, wherein a first clock of the plurality of clocks is associated with a data path of the memory system, a second clock of the plurality of clocks is associated with the processing circuitry of the memory system, and a third clock of the plurality of clocks is associated with a data bus coupled with the memory system.

8. The non-transitory computer-readable medium of claim 1, wherein determining the throughput of the plurality of received commands comprises determining a quantity of the plurality of received commands received during a duration, determining a type of one or more of the plurality of received commands, determining a quantity of data associated with one or more of the plurality of received commands, determining a depth of the queue that includes one or more of the plurality of received commands, determining an address of one or more of the plurality of received commands, or a combination thereof.

9. A non-transitory computer-readable medium storing code comprising instructions which, when executed by processing circuitry of a memory system, cause the memory system to:
  store at least one command of a plurality of received commands in a queue while the memory system is operating in an idle mode, wherein the memory system comprises a plurality of clocks, and wherein each of the plurality of clocks is associated with a respective subcomponent of the memory system;
  transition the memory system from the idle mode to an analysis mode to determine a throughput of the plurality of received commands based at least in part on storing the at least one command of the plurality of received commands;
  adjust, while the memory system is operating in the analysis mode, a rate of at least one of the plurality of clocks to a maximum rate;
  determine, while the memory system is operating in the analysis mode, whether one or more characteristics of the plurality of received commands satisfy a threshold value; and
  adjust a rate of at least one of the plurality of clocks to a second rate lower than the maximum rate based at least in part on determining that the one or more characteristics of the plurality of received commands satisfy the threshold value.

10. The non-transitory computer-readable medium of claim 9, wherein the plurality of received commands are received while the memory system is operating in the analysis mode, in the idle mode, or both, and wherein the instructions, when executed by the processing circuitry of the memory system, further cause the memory system to:
  calculate the throughput of the plurality of received commands based at least in part on the one or more characteristics, wherein adjusting the rate of at least one of the plurality of clocks is based at least in part on the calculated throughput.

11. The non-transitory computer-readable medium of claim 10, wherein the one or more characteristics comprise a quantity of the plurality of received commands received during a duration, a type of one or more of the plurality of received commands, a quantity of data associated with one or more of the plurality of received commands, a depth of the queue that includes one or more of the plurality of received commands, an address of one or more of the plurality of received commands, or a combination thereof.

12. The non-transitory computer-readable medium of claim 9, wherein the instructions, when executed by the processing circuitry of the memory system, further cause the memory system to:
  transition the memory system from the analysis mode to a mode different than the idle mode based at least in part on adjusting the rate of at least one of the plurality of clocks to the second rate.

13. The non-transitory computer-readable medium of claim 9, wherein the instructions, when executed by the processing circuitry of the memory system, further cause the memory system to:
  determine that a first subset of the plurality of received commands satisfies the threshold value;
  determine that a second subset of the plurality of received commands satisfies a second threshold value; and
  adjust the rate of at least one of the plurality of clocks to a third rate based at least in part on determining that the first subset of the plurality of received commands satisfies the threshold value and determining that the second subset of the plurality of received commands satisfies the second threshold value, wherein the threshold value is associated with the third rate and the second threshold value is associated with a fourth rate that is lower than the third rate.

14. The non-transitory computer-readable medium of claim 9, wherein a first clock of the plurality of clocks is associated with a data path of the memory system, a second clock of the plurality of clocks is associated with the processing circuitry of the memory system, and a third clock of the plurality of clocks is associated with a data bus coupled with the memory system.

15. An apparatus, comprising:
  a memory system comprising a plurality of clocks, each of the plurality of clocks associated with a respective subcomponent of the memory system; and
  a controller coupled with the memory system, the controller configured to:
    store at least one command of a plurality of received commands in a queue while operating the memory system in a first mode;
    transition the memory system from operating in the first mode to a second mode to determine a throughput of the plurality of received commands based at least in part on storing the at least one command of the plurality of received commands;
    adjust, while operating in the second mode, a rate of at least one of the plurality of clocks to a maximum rate;
    determine, while operating in the second mode, the throughput of the plurality of received commands based at least in part on the plurality of received commands; and adjust a rate of at least one of the plurality of clocks to a second rate lower than the maximum rate based at least in part on determining the throughput of the plurality of received commands.

16. The apparatus of claim 15, wherein the controller is further configured to:
operate the memory system in a third mode after adjusting the rate of at least one of the plurality of clocks to the second rate.

17. The apparatus of claim 15, wherein the controller is further configured to:
determine a quantity of maintenance operations to be performed on the memory system while the memory system is operating in the first mode; and
adjust the rate of at least one of the plurality of clocks based at least in part on determining the quantity of maintenance operations to be performed on the memory system.

18. The apparatus of claim 15, wherein, to adjust the rate of at least one of the plurality of clocks, the controller is configured to:
select, for a first clock, a first index from a first indexed range that corresponds to a third rate;
select, for a second clock, a second index from a second indexed range that corresponds to a fourth rate; and
select, for a third clock, a third index from a third indexed range that corresponds to a fifth rate.

19. The apparatus of claim 18, wherein, to determine the throughput of the plurality of received commands, the controller is configured to:
categorize the plurality of received commands into one or more categories based at least in part on a characteristic associated with each of the plurality of received commands, wherein the one or more categories are each associated with a respective index from the first indexed range, the second indexed range, or the third indexed range.

20. The apparatus of claim 19, wherein, to determine the throughput of the plurality of received commands, the controller is configured to:
determine that a subset of the plurality of received commands is associated with a first category of the one or more categories and a second category of the one or more categories based at least in part on categorizing the plurality of received commands; and
select, for a respective clock of the plurality of clocks, an index from a fourth index associated with the first category and a fifth index associated with the second category that corresponds to highest rate for the respective clock.

21. The apparatus of claim 15, wherein a first clock of the plurality of clocks is associated with a data path of the memory system, a second clock of the plurality of clocks is associated with processing circuitry of the memory system, and a third clock of the plurality of clocks is associated with a data bus coupled with the memory system.

* * * * *